US006771933B1

(12) United States Patent
Eng et al.

(10) Patent No.: US 6,771,933 B1
(45) Date of Patent: Aug. 3, 2004

(54) WIRELESS DEPLOYMENT OF BLUETOOTH ACCESS POINTS USING A DISTRIBUTED ANTENNA ARCHITECTURE

(75) Inventors: Jim Eng, Cupertino, CA (US); Conway Chan, Los Altos, CA (US); Robin Young, San Jose, CA (US)

(73) Assignee: LGC Wireless, Inc., San Jose, CA (US)

( * ) Notice: Subject to any disclaimer, the term of this patent is extended or adjusted under 35 U.S.C. 154(b) by 626 days.

(21) Appl. No.: 09/818,174

(22) Filed: Mar. 26, 2001

(51) Int. Cl.[7] .................................................. H04B 7/00
(52) U.S. Cl. ..................... 455/41.2; 455/562.1; 370/338
(58) Field of Search ............................. 455/41.2, 41.3, 455/562.1, 426.1, 426.2; 370/338

(56) References Cited

U.S. PATENT DOCUMENTS

2002/0075844 A1 * 6/2002 Hagen ........................ 370/351

OTHER PUBLICATIONS

Lee, David J. Y., et al., "Ricocheting Bluetooth", 200 2nd International Conference on Microwave and Millimeter Wave Technology Proceedings, 2000, pp. 432–435.

* cited by examiner

Primary Examiner—Lee Nguyen
(74) Attorney, Agent, or Firm—Lumen Intellectual Property Services, Inc.

(57) ABSTRACT

The present invention provides a wireless communications system, in which a distributed antenna system (DAS) and one or more master Bluetooth access point modules are employed to extend the range of and wirelessly deploy Bluetooth access points (BTAPs) in a scalable and versatile manner. A variety of wireless personal area networks (WPANs) are further created, to support multiple slave Bluetooth devices. As such, the present invention provides a simplified and easily scalable Bluetooth coverage infrastructure, allows pooling the resources of Bluetooth access points for best performance/cost ratio and dynamic RF routing/filtering in capacity management, and simplifies the provisioning in the system.

25 Claims, 4 Drawing Sheets

WIRELESS DEPLOYMENT OF BLUETOOTH ACCESS POINTS USING A DISTRIBUTED ANTENNA ARCHITECTURE

FIELD OF THE INVENTION

This invention relates generally to wireless communications systems. More particularly, it relates to system and method for wireless deployment of Bluetooth access points using a distributed antenna architecture.

BACKGROUND ART

Bluetooth, a new universal radio interface, has been developed in recent years, enabling electronic devices to communicate via short-range radio connections. The Bluetooth technology not only eliminates the need for wires, cables and connectors between various electronic devices, it also paves the way for new and completely different devices and communications networks.

Bluetooth can also be advantageously utilized as a complement and an extension to wired and wireless communications networks, thereby enabling wireless communications to be virtually ubiquitous. There is therefore a need in the art for a simple, scalable, and economical way of deploying the Bluetooth technology in various wired and wireless communications networks, so as to enhance the capacity and performance of wireless communications.

SUMMARY

The aforementioned need in the art is provided by a wireless communications system of the present invention, in which a distributed antenna system (DAS) is used to extend the range of Bluetooth access points (BTAP) and one or more master Bluetooth access point modules are further utilized to create one or more wireless personal area networks (WPANs) in a scalable and versatile manner.

The distributed antenna system in the present invention employs an effective and scalable architecture that links a main unit to multiple remote units by a signal-transfer means (such as optical fibers, coaxial or CAT5 cables), wherein the remote units are in RF-communication with multiple antennae that are spatially distributed (in an indoor or outdoor environment). The main unit is in RF-communication with an integrated module (IM), which in turn interfaces directly (or indirectly) to a local area network (LAN). One or more master Bluetooth access point modules are in RF-communication with the distributed antenna system, in various configurations as exemplified in the following embodiments. Furthermore, each master Bluetooth access point module is in RF-communication with one or more slave Bluetooth devices, thereby effectively creating a wireless personal area network (WPAN).

In this specification and appending claims, a master Bluetooth access point module generally refers to a master Bluetooth access point radio (M-BTAP), a combination of a wireless LAN (WLAN) radio (e.g., IEEE 802.11b, IEEE 802.11a, HiperLAN, or HiperLAN2) and a master Bluetooth access point radio (WLAN/M-BTAP), or a combination of a master Bluetooth access point radio and any RF radio known in the art. (Note that a Bluetooth access point (BTAP) to a LAN is typically provided by a master Bluetooth radio.)

It should be noted that in this specification, an element is said to be placed in the "back-end" of the communications system of the present invention, if it is connected between the main unit of the distributed antenna system and the LAN. An element is said to be placed in the "front-end" of the communications system of the present invention, if it is in RF-communication with the antennae of the distributed antenna system.

In a first embodiment of the communications system of the present invention, one or more master Bluetooth access point modules in the form of master Bluetooth access point radios (M-BTAPs) are pooled in the back-end of the system, serving as the Bluetooth access points (BTAP) to the LAN. The M-BTAPs are in RF-communication with the main unit via an integrated module. In this case, each M-BTAP communicates with multiple slave Bluetooth devices located in the front-end of the communications system via the distributed antenna system, thereby effectively creating a wireless personal area network (WPAN) that is supported by all of the remote units. Moreover, multiple overlapping WPANs can be created by implementing multiple M-BTAPs in the back-end of the system, thereby increasing the Bluetooth coverage density. Such a configuration provides a simple and flexible way of accommodating the Bluetooth coverage density to the Bluetooth traffic demand, without altering the distributed antenna infrastructure.

In a second embodiment of the communications system of the present invention, one or more master Bluetooth access point modules in the form of master Bluetooth access point radios (M-BTAPs) are embedded in at least one of the remote units, wherein each M-BTAP further communicates with one or more slave Bluetooth devices and thereby forms a WPAN. (Note that the M-BTAPs can alternatively be extended from the remote unit in a wired star or cascaded configuration.) In this case, a remote unit can host multiple M-BTAPs, thus supporting multiple overlapping WPANS that altogether provide a coverage area of greater density. (In situations where each remote unit covers a designated area, the WPANs supported by different remote units are also substantially non-overlapping.) This configuration allows a variety of WPANs to be created in the front end of the system in a scalable and versatile manner, without altering the network configuration in the back-end.

In a third embodiment of the communications system of the present invention, one or more master Bluetooth access point modules in the form of master Bluetooth access point radios (M-BTAPs) are pooled in the back-end of the system, serving as the Bluetooth access points (BTAPS) to the LAN. The M-BTAPs are in RF-communication with the main unit via an integrated module. The system further comprises one or more slave/master Bluetooth access point modules (S/M-BTAPs) located in the front-end of the system, in RF-communication with the antenna. In this case, each M-BTAP communicates with one or more S/M-BTAPs via the distributed antenna system; and each S/M-BTAP in turn communicates with one or more slave Bluetooth devices and thereby creates a WPAN. (That is, a slave-master Bluetooth access point module is essentially a dual module of two Bluetooth access point radios, configured such that it is a "slave" to an M-BTAP located in the back-end and thus serves as an "extended Bluetooth access point", and a "master" to the constituent slave Bluetooth devices in its WPAN.) As such, one M-BTAP (in the back-end) can support multiple S/M-BTAPs (in the front-end); and each S/M-BTAP further supports multiple slave Bluetooth devices. This configuration provides a wirelessly deployment of Bluetooth access points, and an efficient and scalable way of forming a variety of WPANs, as desired in practical applications.

In a fourth embodiment of the communications system of the present invention, one or more master Bluetooth access point modules are distributed in the front-end of the system. In this case, each master Bluetooth access point module is in the form of a combination of a WLAN radio (e.g.,IEEE 802.11b, IEEE 802.11a, HiperLAN, or HiperLAN2.) and a master Bluetooth access point radio (WLAN/M-BATP). The master Bluetooth access point radio in each WLAN/M-BTAP communicates with one or more slave Bluetooth devices, thereby forming a WPAN. And the WLAN radio in the same module serves to communicate with WLAN access points (WLAN APs) (which are typically IEEE802.11 radios) tapped to the LAN, thereby providing access to the LAN and its application server. As such, the distributed antenna system effectively extends the WLAN access points from the back-end to the front-end of the system, at which Bluetooth access points are wirelessly deployed and a plurality of WPANS further created.

In the aforementioned embodiments (and many alternative embodiments according to the present invention), the employment of a distributed antenna system provides an effective and scalable way of extending the range of Bluetooth (or WLAN) access points. And the coupling of various types of master Bluetooth access point modules with the distributed antenna system enables Bluetooth (or WLAN) access points to be wirelessly deployed in the front-end of the system, at locations desired in practical applications. And the WPANs thus created (in overlapping and/or non-overlapping forms) greatly enhance the Bluetooth coverage and thereby increase the system performance. As such, the present invention provides a simplified and easily scalable Bluetooth coverage infrastructure, allows pooling the resources of Bluetooth (or WLAN) access points for best performance/cost ratio and capacity management, and simplifies the provisioning in the front-end.

The wireless communications system according to the present invention may further include a controller (e.g., provided by a processor), in communication with the LAN or the main unit of the distributed antenna system, for performing capacity management. Working together with the application server of the LAN, the controller enables dynamic RF routing/filtering to be performed at the main unit, expansion units and/or remote units, such that a particular group of downlink RF signals (e.g., the downlink RF signals transmitted from a specific M-BTAP or WLAN AP, or a selected group of M-BTAPs or WLAN APs, in the back-end) is directed to one or more designated remote units. And the uplink signals from the designated remote units are in turn routed to the specific M-BTAP (or WLAN AP). This allows various resources in the system to be utilized in an optimal manner, thereby enhancing the overall performance of the system.

It should be noted that the distributed antenna system in the present invention may further include one or more expansion units, each serving as an intermediate hub for facilitating the transportation and distribution of RF signals.

The wireless communications system of the present invention can be implemented in both indoor and outdoor environments, including (but not limited to) airports, malls, office buildings, tunnels, hotels, convention centers and sports arenas.

The novel features of this invention, as well as the invention itself, will be best understood from the following drawings and detailed description.

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiment of the invention described below is set forth without any loss of generality to, and without imposing limitations upon, the claimed invention.

In this specification and appending claims, a master Bluetooth access point module generally refers to a master Bluetooth access point radio (M-BTAP), a combination of a wireless LAN (WLAN) radio (e.g., IEEE 802.11b, IEEE 802.11a, HiperLAN, or HiperLAN2) and a master Bluetooth access point radio (WLAN/M-BTAP), or a combination of a master Bluetooth access point radio and any RF radio known in the art. (Note that a Bluetooth access point (BTAP) to a LAN is typically provided by a master Bluetooth radio.)

Figure 1:
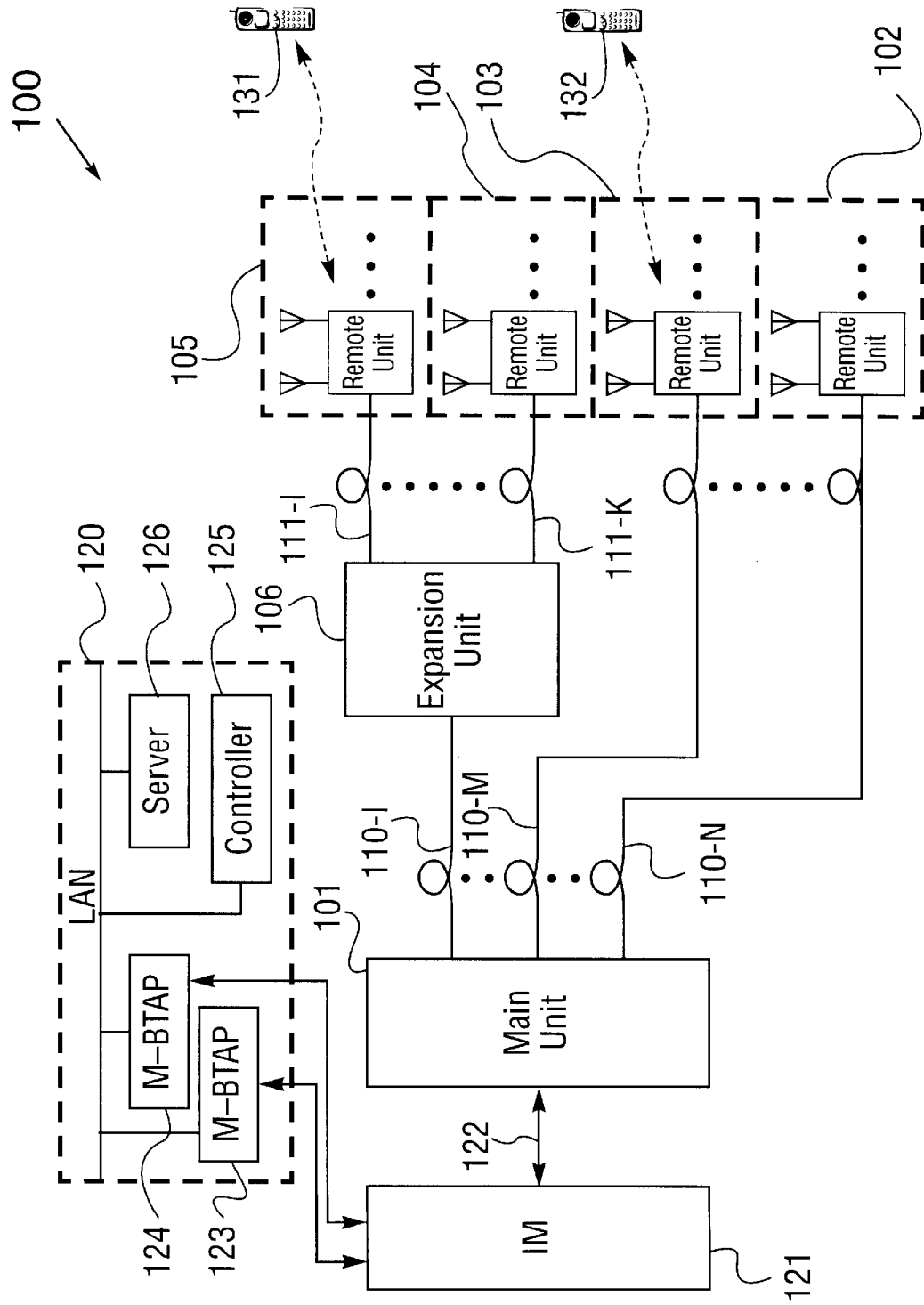
FIG. 1 depicts a first exemplary embodiment of a wireless communications system employing a distributed antenna system and a plurality of M-BTAPs in the back-end, according to the present invention.

FIG. 1 depicts a first exemplary embodiment of a wireless communications system employing a distributed antenna system and a plurality of M-BTAPs in the back-end, according to the present invention. By way of example to illustrate the principal concept and the topological structure of the present invention, the distributed antenna system in wireless communications system 100 comprises a main unit 101; multiple remote units equipped with multiple antennae, including first, second, third, fourth cascaded chains of remote units 102, 103, 104, 105; an expansion unit 106; and a signal-transfer means in the form of primary-optical-fibers 110-1 through 110-N and secondary-optical-fibers 111-1 through 111-K, which links the main unit to the expansion and remote units. Wireless communications system 100 further comprises a plurality of master Bluetooth access point modules in the form of master Bluetooth access point radios (M-BTAPs), including first and second M-BTAPs 123, 124, which are connected and serve as the Bluetooth access points (BTAPs) to a local area network (LAN) 120. First and second M-BTAPs 123, 124 are in RF-communication with main unit 101 via an integrated module 121 (which is connected to the main unit by an RF-transfer means 122, such as RF cables). An application server 126 and a controller 125 are connected to LAN 120.

It should be noted that in this specification, an element is said to be placed in the "back-end" of the communications system of the present invention if it is connected with both the LAN and the main unit of the distributed antenna system (which may be via an integrated module as in the embodiment of FIG. 1). An element is said to be placed in the "front-end" of the communications system of the present invention, if it is in RF-communication with the antennae of the distributed antenna system.

It should also be noted that in this specification and accompanying drawings, each remote unit is shown to be assigned with two antennae by way of example. In general, there can be any number of antennae assigned to a remote unit. And the antennae can be either active, or passive. There can be one or more expansion units in a distributed antenna system. Moreover, the remote units can be linked to the main unit and/or one or more expansions in individual and cascaded forms. (For instance, the number of the remote units in each of first, second, third, fourth cascaded chains of remote units 102, 103, 104, 105 shown in FIG. 1 may vary.)

Wireless communications system 100 operates as follows. Take first M-BTAP 123 as a way of example. On the downlink, first M-BTAP 123 converts data packets from LAN 120 to downlink Bluetooth RF signals, which are then passed onto main unit 101 by way of integrated module 121 and RF-transfer means 122. At main unit 101, the downlink Bluetooth RF signals are converted to downlink optical signals, which are subsequently transmitted to the remote units, including first, second, third, fourth cascaded chains of remote units 102, 103, 104, 105, by way of primary-optical-fibers 110-1 through 110-N and secondary-optical-fibers 111-1 through 111-K. At the remote units, the received downlink optical signals are converted back to the downlink Bluetooth RF signals, which are subsequently transmitted to the slave Bluetooth devices located in the front-end of the system, such as first and second slave Bluetooth devices 131, 132, by the antennae coupled to the remote units.

On the uplink, uplink Bluetooth RF signals transmitted from a slave Bluetooth device in the front-end, such as first Bluetooth device 131 or second Bluetooth device 132, are first received by the antennae, subsequently converted to uplink optical signals at the corresponding remote units, and further transmitted to main unit 101 by way of primary-optical-fibers 110-1 through 110-N and secondary-optical-fibers 111-1 through 111-K. At main unit 101, the uplink optical signals are converted back to the uplink Bluetooth RF signals, and further passed onto first M-BTAP 123 by way of integrated module 121 and RF-transfer means 122. First M-BTAP 123 converts the uplink Bluetooth RF signals to appropriate data packets, which are then sent to LAN 120.

Likewise, second M-BTAP 124 in the embodiment of FIG. 1 works in substantially the same way as first M-BTAP 123, as described above. As such, each M-BTAP in the back-end serves as a "master" to one or more slave Bluetooth devices in the front-end, thereby effectively creating a wireless personal area network (WPAN) that is supported by all of the remote units. Moreover, multiple overlapping WPANS can be accordingly created by placing multiple M-BTAPs in the back-end of the system, thereby increasing the Bluetooth coverage density in the front-end. (As a way of example, each WPAN in this embodiment can support up to seven active slave Bluetooth devices, such as Bluetooth enabled cellular phones, or Personal Digital Assistants (PDAs)).

Figure 2:
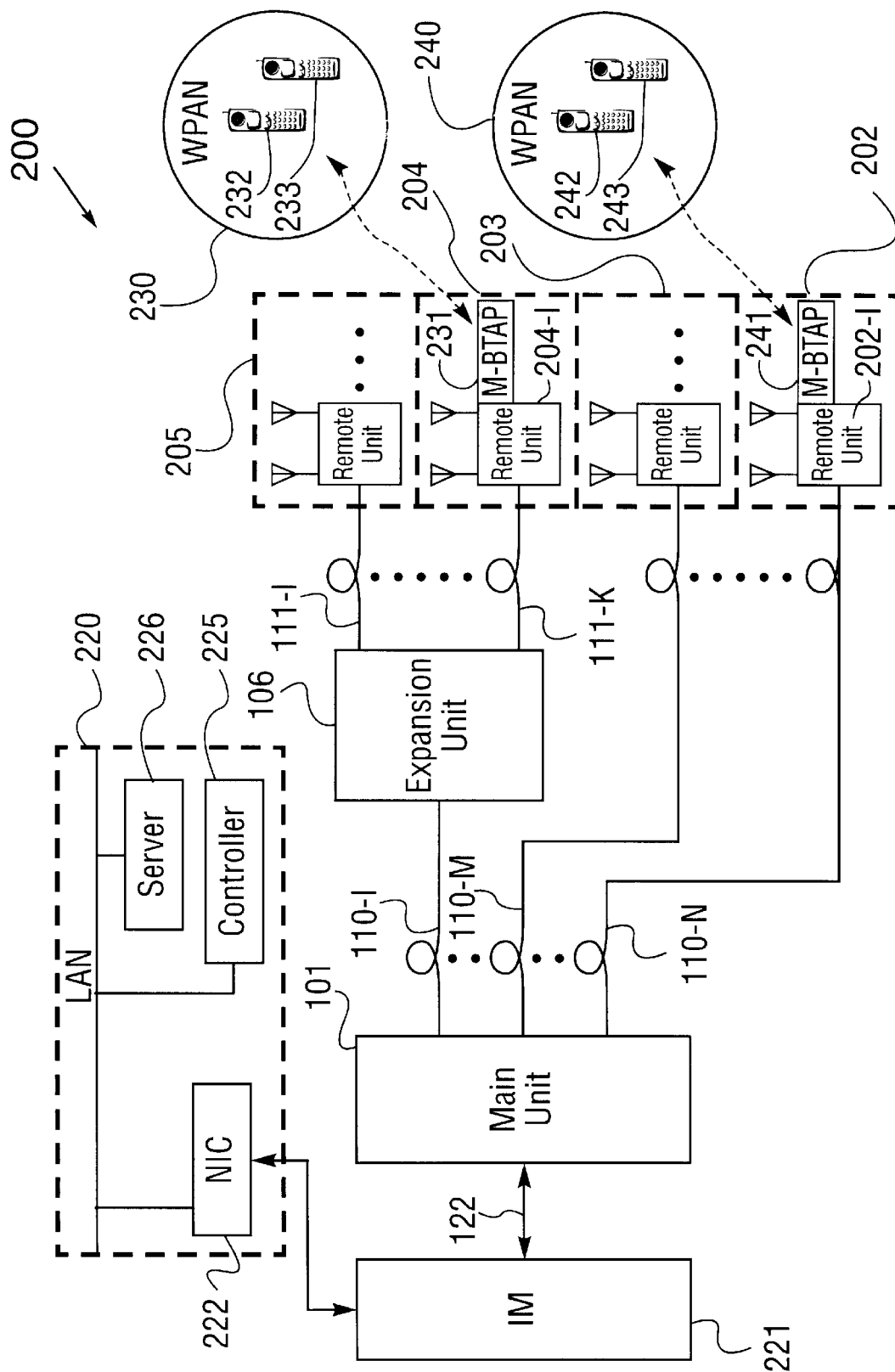
FIG. 2 depicts a second exemplary embodiment of a wireless communications system employing a distributed antenna system and a plurality of M-BTAPs located in the front-end, according to the present invention.

FIG. 2 depicts a second exemplary embodiment of a wireless communications system employing a distributed antenna system and a plurality of M-BTAPs in the front-end, according to the present invention. Wireless communications system 200 utilizes a distributed antenna system that shares the same architecture and a number of the components in the distributed antenna system of the embodiment of FIG.1, as indicated by those labeled with identical numerals. In this case, rather than placing one or more M-BTAPs in the back-end of the system, the M-BTAPs are embedded in one or more remote units in the distributed antenna system. By way of example, a remote unit 202-1 in first cascaded chain of remote units 202 is embedded with a first M-BTAP 241, another remote unit 204-1 in third cascaded chain of remote units 204 is embedded with a second M-BTAP 231, and so on. (It should be noted that more than one M-BTAP can be embedded in a remote unit. And one or more M-BTAPs can alternatively be extended from the remote unit in a wired star or cascaded configuration.) Furthermore, main unit 101 is connected to a LAN 220 via an integrated module 221 (which is connected to main unit 101 by RF-transfer means 122) and a network interface card 222. An application server 226 and a controller 225 are connected to LAN 220.

In the embodiment of FIG. 2, first M-BTAP 241 in turn communicates with a group of slave Bluetooth devices including slave Bluetooth devices 242, 243, thereby creating a first WPAN 240. Likewise, second M-BTAP 231 communicates with another group of slave Bluetooth devices including slave Bluetooth devices 232, 233, thereby creating a second WPAN 230. Notice that WPANs 230, 240 are non-overlapping in this case. As such, by embedding multiple M-BTAPS in a remote unit, a great number of WPANS can be created. This increases the number of slave Bluetooth devices that can be supported by a remote unit.

Wireless communications system 200 operates as follows. Take first M-BTAP 241 as a way of example. On the uplink, first M-BTAP 241 receives uplink Bluetooth RF signals by way of the antenna associated with remote unit 202-1 from a slave Bluetooth device 242 (or 243) and converts the uplink RF signals to data packets. At remote unit 202-1, IP data packets are modulated onto uplink optical signal carriers and subsequently transmitted to main unit 101, where the modulated optical signal carriers are converted to uplink RF carriers to be forwarded to integrated module 221. Integrated module 221 de-modulates the original data packets from the uplink RF carriers and sends the demodulated data packet to LAN 220. The operation on the downlink is simply the reverse of the uplink operation thus described. And second M-BTAP 231 operates in substantially the same way.

Figure 3:
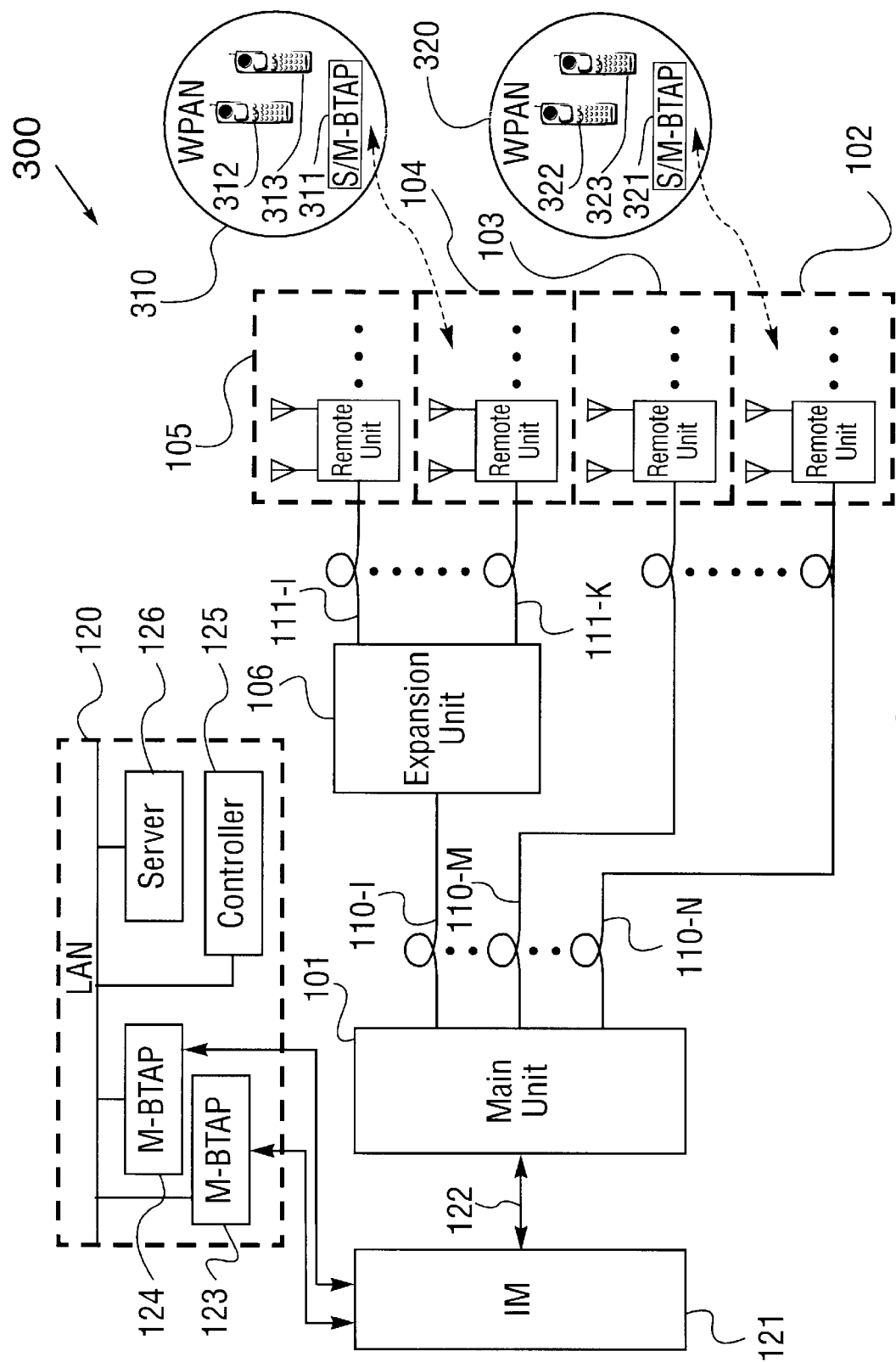
FIG. 3 depicts a third exemplary embodiment of a wireless communications system employing a distributed antenna system and a plurality of M-BTAPs located in the back-end and S/M-BTAPs in the front-end, according to the present invention.

FIG. 3 depicts a third exemplary embodiment of a wireless communications system employing a distributed antenna system and a plurality of M-BTAPs in the back-end and S/M-BTAPs in the front-end, according to the present invention. Wireless communications system 300 is configured in substantially the same way as and share many of the components in the embodiment of FIG. 1, as indicated by those labeled with identical numerals. In addition, wireless communications system 300 includes a plurality of slave/master Bluetooth access point modules (S/M-BTAPs) wirelessly deployed in the front-end of the system, including first and second S/M-BTAPs 311, 321. In this case, each M-BTAP in the back-end, such as first M-BTAP 123 or second M-BTAP 124, serves as a "master" to and communicates with one or more S/M-BTAPs in the front-end via the distributed antenna system. Moreover, each S/M-BTAP in turn serves as a "master" to and communicates with one or more slave Bluetooth devices in the front-end of the system, thereby forming a WPAN. As a way of example, first S/M-BTAP 311 communicates with a group of slave Bluetooth devices including slave Bluetooth devices 312, 313. Likewise, second S/M-BTAP 321 communicates with another group of slave Bluetooth devices including slave Bluetooth devices 322, 323.

In the embodiment of FIG. 3, the downlink and uplink operations between M-BTAPs and S/M-BTAPs are substantially similar to those in wireless communications system 100 of FIG. 1, as described above. (Note that the interface between the slave and master Bluetooth access point radios in each S/M-BTAP is in data-packet form). Multiple S/M-BTAPs can be wirelessly deployed at locations desired in practical applications. Moreover, multiple WPANS thus formed can be overlapping, or non-overlapping.

Figure 4:
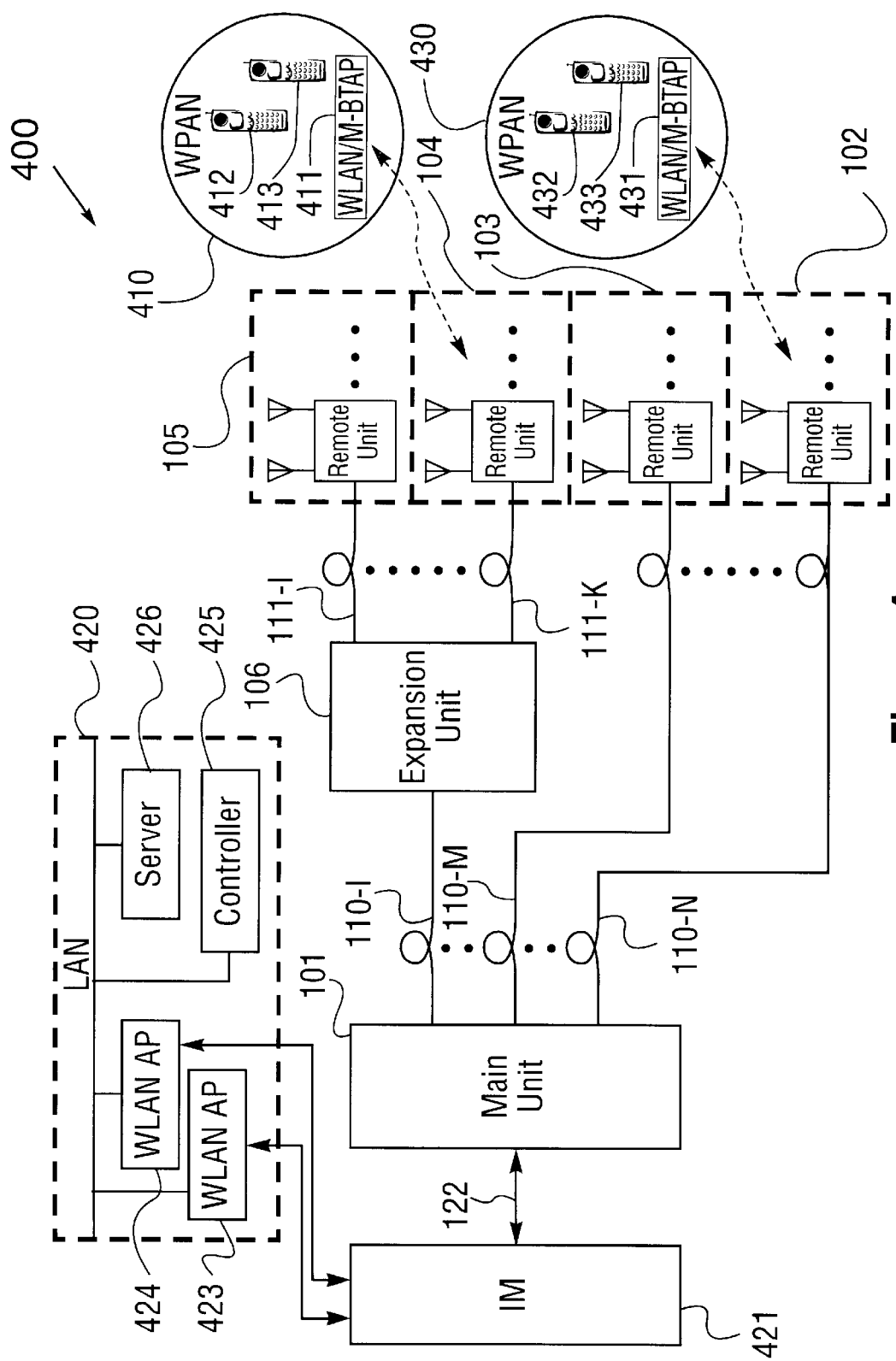
FIG. 4 depicts a fourth exemplary embodiment of a wireless communications system employing a distributed antenna system and a plurality of WLAN/M-BTAPs in the front-end communicating with WLAN APs in the back-end, according to the present invention.

FIG. 4 depicts a fourth exemplary embodiment of a wireless communications system employing a distributed antenna system and a plurality of master Bluetooth access point modules in the form of WLAN/M-BTAPs in the front-end, according to the present invention. Wireless communications system 400 employs the same distributed antenna system used in the embodiment of FIG.1, as indicated by the components labeled with identical numerals. Wireless communications system 400 further comprises a plurality of WLAN/M-BTAPs wirelessly deployed in the front-end, including first and WLAN/M-BTAPs 411, 431, wherein each WLAN/M-BTAP is in the form of a combination of a WLAN radio and a master Bluetooth access point radio. As a way of example, the master Bluetooth access point radio in first WLAN/M-BTAP 411 further communicates with slave Bluetooth devices 412, 413, thereby forming a first WPAN 410. And the WLAN radio in first WLAN/M-BTAP 411 serves to communicate with WLAN access points (WLAN APs, which are typically IEEE802.11 radios) including WLAN APs 423, 424, thereby providing access to LAN 420 and its application server 426. Likewise, the master Bluetooth access point radio in second WLAN/M-BTAP 431 communicates with slave Bluetooth devices 432, 433, thereby forming a second WPAN 430. And the WLAN radio in second WLAN/M-BTAP 431 serves to communicate with WLAN APs tapped to LAN 420 and thereby provides access to LAN 420 and its application server 426. As such, the distributed antenna system effectively extends the WLAN access points from the back-end to the front-end of the system, at which Bluetooth access points are wirelessly deployed and a plurality of WPANS are further created.

In operation, on the uplink route, each master Bluetooth access point radio in a WLAN/M-BTAP receives uplink Bluetooth RF signals from its constituent slave Bluetooth devices, and converts these signals to data packet. The WLAN radio in the same WLAN/M-BTAP then modulates these data packets onto uplink RF signals in the IEEE802.11 frequency band and transmits the modulated uplink RF signals to the antennae of the distributed antenna system. At the remote units, the uplink RF signals are converted to uplink optical signals, which are then carried to the main unit by the optical fibers. At the main unit, the uplink optical signals are converted back to the uplink RF signals, which are then sent to and passed through integrated module 421 onto WLAN APs. WLAN APs demodulate the original data packets from the receive uplink RF signals and forward the demodulated data packets to LAN 420. The downlink operation in this system is essentially the reverse of the thus described uplink operation.

Those skilled in the art will recognize that various slave Bluetooth devices shown in the above exemplary embodiments are provided for illustrative purpose. In general, they can be any types of electronic devices equipped with the Bluetooth capability, including (but not limited to) pagers, modems, PDAs, PocketPCs, laptops, and other wireless communications means known in the art.

The wireless communications system according to the present invention may further include a controller for performing capacity management, as illustrated by controller 125, 225, or 425 in the above exemplary embodiments. Working together with the application server of the corresponding LAN, the controller enables dynamic RF routing/filtering to be performed at the main unit, expansion units and/or remote units, such that a particular group of downlink RF signals (e.g., the downlink RF signals transmitted from a specific M-BTAP or WLAN AP in the back-end) is directed to one or more designated remote units. And the uplink signals from the designated remote units are accordingly routed to the specific M-BTAP or WLAN AP. This allows RF-reuse among the remote units, thereby increasing the number of slave Bluetooth devices that can be supported in the front-end.

In the aforementioned embodiments (and many alternative embodiments according to the present invention), the employment of a distributed antenna system provides an effective and scalable way of extending the range of Bluetooth or WLAN access points. And the coupling of various types of master Bluetooth access point modules with the distributed antenna system enables Bluetooth access points to be wirelessly deployed in the front-end of the system, at locations desired in practical applications. And the WPANs thus created (in overlapping and/or non-overlapping forms) greatly enhance the Bluetooth coverage and thereby increase the system performance. As such, the present invention provides a simplified and easily scalable Bluetooth coverage infrastructure, allows pooling the resources of Bluetooth access points (or WLAN APs) for best performance/cost ratio and capacity management, and simplifies the provisioning in the front-end.

The wireless communications system of the present invention can be implemented in both indoor and outdoor environments, including (but not limited to) airports, malls, office buildings, tunnels, hotels, convention centers and sports arenas.

Those skilled in the art will recognize that the exemplary embodiments described above provide only several of many embodiments of wireless deployment of Bluetooth access points and creating WPANs thereof, according to the present invention. Those skilled in the art will also appreciate that various changes, substitutions, and alternations can be made herein without departing from the principle and the scope of the invention. Accordingly, a variety of location-positioning schemes and systems can be constructed in accordance with the principle of the present invention.

For instance, existing PBX infrastructure can be advantageously exploited to provide a distributed antenna system according to the present invention. This can be accomplished by replacing telephones in a PBX network with remote units equipped with antennae, or enhancing the telephones with remote-unit capabilities and connecting multiple antennae to thus-created remote units. Such a modified PBX system coupled with master Bluetooth access point modules can be effectively used to provide a communications system according to the present invention in an indoor environment.

Although the present invention and its advantages have been described in detail, it should be understood that various changes, substitutions, and alternations can be made herein without departing from the principle and the scope of the invention. Accordingly, the scope of the present invention should be determined by the following claims and their legal equivalents.

What is claimed is:

1. A wireless communications system comprising:
   a) A distributed antenna system, comprising i) a main unit communicatively connecting to a first local area network (LAN);
ii) a signal-transfer means connected to said main unit for transmitting signals to and from said main unit;
iii) multiple remote units; and
iv) multiple antennae, in RF-communication with said remote units; wherein said remote units are linked to said main unit by way of said signal-transfer means; and b) one or more master Bluetooth access point modules, in RF-communication with said distributed antenna system.

2. The wireless communications system of claim 1 wherein said one or more master Bluetooth access point modules are in RF-communication with said antennae and are capable of converting RF signals to data packets and data packets to RF signals.

3. The wireless communications system of claim 2 wherein each of said one or more master Bluetooth access point modules is further in RF-communication with one or more slave Bluetooth devices, thereby creating a wireless personal area network (WPAN) network.

4. The wireless communications system of claim 2 wherein each of said one or more master Bluetooth access point modules comprises a combination of a WLAN radio and a master Bluetooth access point radio (WLAN/M-BTAP).

5. The wireless communications system of claim 4 further comprising one or more WLAN access points tapped into a second or more LAN.

6. The wireless communications system of claim 4 wherein each of said one or more master Bluetooth access point modules communicates with said antennae in the IEEE802.11 frequency band.

7. The wireless communications system of claim 2 wherein said one or more master Bluetooth access point modules are embedded in at least one of said remote units.

8. The wireless communications system of claim 7 wherein each of said one or more master Bluetooth access point modules is further in RF-communication with one or more slave Bluetooth devices, thereby creating a WPAN.

9. The wireless communications system of claim 7 wherein each of said one or more master Bluetooth access point modules comprises a master Bluetooth access point radio (M-BTAP).

10. The wireless communications system of claim 2 wherein said one or more one master Bluetooth access point modules are extended from at least one of said remote units in a wired star or cascaded configuration.

11. The wireless communications system of claim 10 wherein each of said one or more one master Bluetooth access point modules is further in RF-communication with one or more slave Bluetooth devices, thereby creating a WPAN.

12. The wireless communications system of claim 10 wherein each of said one or more master Bluetooth access point modules comprises a master Bluetooth access point radio (M-BTAP).

13. The wireless communications system of claim 1 wherein said one or more master Bluetooth access point modules are connected to said LAN, serve as Bluetooth access points (BTAPs) for said LAN, and are in RF-communication with said main unit; wherein said one or more master Bluetooth access point modules are capable of converting data packets to RF signals and RF signals to data packets.

14. The wireless communications system of claim 13 wherein each of said one or more master Bluetooth access point modules comprises a master Bluetooth access point radio (M-BTAP) and further communicates with one or more slave Bluetooth devices via said distributed antenna system, thereby creating a WPAN.

15. The wireless communications system of claim 13 wherein each of said one or more mater Bluetooth access point modules comprises a master Bluetooth access point radio (M-BTAP) and further communicates with one or more slave/master Bluetooth access point modules (S/M-BTAPs) via said distributed antenna system.

16. The wireless communications system of claim 15 wherein each of said one or more slave/master Bluetooth access point modules (S/M-BTAPs) further communicates with one or more slave Bluetooth devices, thereby creating a WPAN.

17. The wireless communications system of claim 15 wherein each of said one or more slave/master Bluetooth access point modules (S/M-BTAPs) comprises slave and master Bluetooth access point radios.

18. The wireless communications system of claim 1 wherein said signal-transfer means comprises one or more elements selected from the group consisting of optical fibers and RF-cables.

19. The wireless communication system of claim 18 wherein said RF-cables are selected from the group consisting of coaxial cables and CAT5 cables.

20. The wireless communication system of claim 1 wherein each of said remote units is assigned with at least one of said antennae.

21. The wireless communication system of claim 1 wherein said distributed antenna system further comprises at least one expansion unit.

22. The wireless communication system of claim 1 further comprising an integrated module interfacing said main unit and said LAN, wherein said main unit is in RF-communication with said integrated module.

23. The wireless communication system of claim 22 further comprising a controller connected to said LAN for performing capacity management and enabling dynamic RF routing/filtering.

24. The wireless communication system of claim 23 wherein said signal-transfer means comprises RF-cables connecting said integrated module and said main unit and fiber optics connecting said main unit and said multiple remote units.

25. The wireless communication system of claim 23 wherein said main unit is capable of converting RF signals to optical signals and optical signals to RF signals; and wherein said multiple remote units are capable of converting optical signals to RF signals and RF signals to optical signals.

* * * * *